United States Patent
Kong et al.

(10) Patent No.: US 8,749,372 B2
(45) Date of Patent: Jun. 10, 2014

(54) REMOTE MONITORING SYSTEMS AND METHODS

(75) Inventors: James Po Kong, Katy, TX (US); Charles Anthony Lickteig, Katy, TX (US); Robert Frank Parchewsky, The Hague (NL)

(73) Assignee: Shell Oil Company, Houston, TX (US)

( * ) Notice: Subject to any disclaimer, the term of this patent is extended or adjusted under 35 U.S.C. 154(b) by 538 days.

(21) Appl. No.: 12/664,091

(22) PCT Filed: Jun. 16, 2008

(86) PCT No.: PCT/US2008/067134
§ 371 (c)(1),
(2), (4) Date: May 6, 2010

(87) PCT Pub. No.: WO2008/157505
PCT Pub. Date: Dec. 24, 2008

(65) Prior Publication Data
US 2010/0219950 A1 Sep. 2, 2010

Related U.S. Application Data

(60) Provisional application No. 60/944,286, filed on Jun. 15, 2007.

(51) Int. Cl.
*G08B 23/00* (2006.01)
(52) U.S. Cl.
USPC .......................... 340/500; 700/108
(58) Field of Classification Search
USPC ................................. 340/500, 540
See application file for complete search history.

(56) References Cited

U.S. PATENT DOCUMENTS

| | | | | |
|---|---|---|---|---|
| 4,559,610 | A | 12/1985 | Sparks et al. | 364/803 |
| 4,561,402 | A | 12/1985 | Nakano et al. | 123/489 |
| 5,437,254 | A | 8/1995 | Korenaga et al. | 123/416 |
| 5,461,311 | A | 10/1995 | Nakazato et al. | 324/207.24 |
| 6,292,757 | B1 | 9/2001 | Flanagan et al. | 702/138 |
| 6,453,265 | B1 | 9/2002 | Dekhil et al. | 702/181 |
| 6,646,564 | B1 * | 11/2003 | Azieres et al. | 340/679 |
| 6,745,321 | B1 | 6/2004 | Floyd et al. | |
| 6,748,341 | B2 | 6/2004 | Crowder, Jr. | 702/181 |
| 6,819,327 | B2 | 11/2004 | Wasserman et al. | |
| 6,842,742 | B1 * | 1/2005 | Brookner | 705/60 |

(Continued)

FOREIGN PATENT DOCUMENTS

| | | |
|---|---|---|
| EP | 1489474 A2 | 12/2004 |
| GB | 2414560 A | 7/2007 |

(Continued)

OTHER PUBLICATIONS

General Electric, "Decision Support Studio*/Developer Edition", date unknown (rev. Feb. 2005?), http://www.geenergy.com/prod_serv/products/oc/en/downloads/decision_support_se_gea_13912b.pdf, pp. 1-2.

(Continued)

*Primary Examiner* — Brian Zimmerman
*Assistant Examiner* — Sara Samson

(57) ABSTRACT

A method comprising selecting a piece of equipment to be monitored; selecting a plurality of operating parameters to monitor; calculating a deviation for each of the operating parameters; and calculating a composite index for the piece of equipment based on the deviations.

15 Claims, 6 Drawing Sheets

(56) References Cited

U.S. PATENT DOCUMENTS

| | | | |
|---|---|---|---|
| 7,044,373 B1 | 5/2006 | Garber et al. | 235/385 |
| 7,123,151 B2 | 10/2006 | Garber et al. | 340/572.4 |
| 2001/0053940 A1 | 12/2001 | Horn et al. | 700/32 |
| 2002/0161940 A1 | 10/2002 | Eryurek et al. | |
| 2004/0003318 A1 | 1/2004 | Felke et al. | |
| 2004/0153437 A1 | 8/2004 | Buchan | 707/1 |
| 2004/0158474 A1 | 8/2004 | Karschnia et al. | |
| 2005/0007249 A1* | 1/2005 | Eryurek et al. | 340/511 |
| 2005/0007826 A1 | 1/2005 | Boggs et al. | 365/189.01 |
| 2005/0049832 A1 | 3/2005 | Gorinevsky | 702/182 |
| 2005/0159922 A1 | 7/2005 | Hsiung et al. | 702/182 |
| 2005/0205037 A1 | 9/2005 | Lewis et al. | 123/179.16 |
| 2006/0071666 A1 | 4/2006 | Unsworth et al. | |
| 2008/0016353 A1 | 1/2008 | Carro | 713/171 |
| 2008/0129507 A1 | 6/2008 | Doan et al. | 340/572.1 |

FOREIGN PATENT DOCUMENTS

| | | | |
|---|---|---|---|
| WO | 02086726 A1 | 10/2002 | |
| WO | WO2005108744 | 11/2005 | F01B 31/12 |
| WO | 2006093746 A2 | 9/2006 | |

OTHER PUBLICATIONS

General Electric, "RulePaks", date unknown (rev. Feb. 2005?), http://www.geenergy.com/prod_serv/products/oc/en/downloads/rulepaks_se_gea_13910b.pdf, pp. 1-2.
General Electric website page entitled "Bently Nevada™ Machinery Diagnostic Services", date unknown (copyright 1997-2010?), http://www.ge-energy.com/prod_serv/products/oc/en/condition_monitoring/machinery_diag.htm, pp. 1-2.
General Electric, website page entitled "System 1® Software", date unknown (copyright 1997-2010?), http://www.geenergy.com/prod_serv/products/oc/en/system_soft.htm, pp. 1 to 3 of printout.
General Electric, website page entitled "Condition Monitoring Solutions for Reciprocating Compressors", date unknown (copyright 1997-2010?), http://www.ge-energy.com/prod_serv/products/oc/en/bently_nevada/condition_solutions.htm, pp. 1 to 2 of printout.
General Electric, "Petroleum Refining", date unknown (©2010), http://www.geenergy.com/prod_serv/products/oc/en/downloads/GEA17985A_8.25x11_LR.pdf, pp. 1-12.
General Electric, website page entitled "Bently Performance©", date unknown (copyright 1997-2010?), http://www.ge-energy.com/prod_serv/products/oc/en/opt_diagsw/bently_performance.htm, pp. 1 to 2 of printout.

* cited by examiner

FIG. 1

CCOMS- Centrifugal Compressors

| Divisions (data range): | 100.0 |
|---|---|
| Yellow Threshold (%): | 75.0 |
| Red Threshold (%): | 100.0 |

CCOMS- Single Stage Compressor

| # Indicators (n) | | 4.0 | sqrt(n) | 2.00 | | | |
|---|---|---|---|---|---|---|---|
| Absolute Values | | | | | | | |
| n | Indicator | Range % | Current | Dev % | Dev %^2 | Yellow | Red | Status |
| 1 | Delta T | 20.00 | 13.00 | 65.00 | 4225.00 | 0 | 0 | 0 |
| 2 | Delta Bf | 10.00 | 8.00 | 80.00 | 6400.00 | 1 | 0 | 4 |
| 3 | Delta Head | 10.00 | 6.00 | 60.00 | 3600.00 | 0 | 0 | 0 |
| 4 | Delta Power | 10.00 | 7.00 | 70.00 | 4900.00 | 0 | 0 | 0 |
| | | | | | 97.79 | 1 | 0 | 4 |

Index (%): 97.79
Status (64 bits digital mask): 4

| Rate of change Values | | | | | | | | |
|---|---|---|---|---|---|---|---|---|
| n | Indicator | %/Month | Current | Dev % | Dev %^2 | Yellow | Red | Status |
| 1 | Delta T | 2.00 | 0.90 | 45.00 | 2025.00 | 0 | 0 | 0 |
| 2 | Delta Bf | 1.00 | 0.75 | 75.00 | 5625.00 | 1 | 0 | 4 |
| 3 | Delta Head | 1.00 | 1.10 | 110.00 | 12100.00 | 1 | 1 | 26 |
| 4 | Delta Power | 1.00 | 0.50 | 50.00 | 2500.00 | 0 | 0 | 0 |
| | | | | | 105.48 | 2 | 1 | 30 |

Index (%): 100.00
Status (64 bits digital mask): 30

SWP Complete Report

Monitoring SWP with 28 trains for a total of 56 equipment bodies.

Complete: Train, Body, Tag　　Exception: Train, Body, Tag

Smartness: Level -1

| Train | Service | RunStatus | 1 day %Util | 30 days %Util | 90 days %Util |
|---|---|---|---|---|---|
| A-231A | A-231A Air Compression | ⊘⊙⊙ | 00.0 | 00.0 | 00.0 |
| A-231B | A-231B Air Compression | ⊙⊙⊘ | 00.0 | 00.0 | 00.0 |
| A-231C | A-231C Air Compression | ⊘⊙⊙ | 00.0 | 00.0 | 00.0 |
| G-171A | G-171A Main Power Generation | ⊘⊙⊙ | 00.0 | 00.0 | 00.0 |
| G-171B | G-171B Main Power Generation | ⊙⊙⊘ | 00.0 | 00.0 | 00.0 |
| G-171C | G-171C Main Power Generation | ⊘⊙⊙ | 00.0 | 00.0 | 00.0 |
| K-122A | K-122A Flash Gas Compression | ⊘⊙⊙ | 00.0 | 00.0 | 00.0 |
| K-122B | K-122B Flash Gas Compression | ⊘⊙⊙ | 00.0 | 00.0 | 00.0 |
| K-127A | K-127A Flash Gas Compression | ⊘⊙⊙ | 00.0 | 00.0 | 00.0 |
| K-127B | K-127B Flash Gas Compression | ⊘⊙⊙ | 00.0 | 00.0 | 00.0 |
| K-153A | K-153A Export Gas Compression | ⊘⊙⊙ | 00.0 | 00.0 | 00.0 |
| K-153B | K-153B Export Gas Compression | ⊙⊙⊘ | 00.0 | 00.0 | 00.0 |
| P-222A | P-222A Heating Medium Circulation Pumping | ⊘⊙⊙ | 00.0 | 00.0 | 00.0 |
| P-222B | P-222B Heating Medium Circulation Pumping | ⊘⊙⊙ | 00.0 | 00.0 | 00.0 |
| P-307A | P-307A CCWS Circulation Pumping | ⊘⊙⊙ | 00.0 | 00.0 | 00.0 |
| P-307B | P-307B CCWS Circulation Pumping | ⊙⊙⊘ | 00.0 | 00.0 | 00.0 |
| P-348A | P-348A LP Flare Drum Pumping | ⊘⊙⊙ | 00.0 | 00.0 | 00.0 |
| P-348B | P-348B LP Flare Drum Pumping | ⊘⊙⊙ | 00.0 | 00.0 | 00.0 |
| P-373A | P-373A Methanol Subsea Injection Pumping | ⊙⊙⊘ | 00.0 | 00.0 | 00.0 |
| P-373B | P-373B Methanol Subsea Injection Pumping | ⊘⊙⊙ | 00.0 | 00.0 | 00.0 |
| P-373C | P-373C Methanol Subsea Injection Pumping | ⊙⊙⊙ | 00.0 | 00.0 | 00.0 |
| P-373D | P-373D Methanol Subsea Injection Pumping | ⊘⊙⊙ | 00.0 | 00.0 | 00.0 |
| P-375A | P-375A Methanol Process Injection Pumping | ⊘⊙⊙ | 00.0 | 00.0 | 00.0 |
| P-375B | P-375B Methanol Process Injection Pumping | ⊘⊙⊙ | 00.0 | 00.0 | 00.0 |
| P-701A | P-701A Export Condensate Loading | ⊘⊙⊙ | 00.0 | 00.0 | 00.0 |
| P-701B | P-701B Export Condensate Loading | ⊙⊙⊘ | 00.0 | 00.0 | 00.0 |
| P-303A | P-303A Sea Water Lifting Pump | ⊙⊙⊘ | 00.0 | 00.0 | 00.0 |
| P-303B | P-303B Sea Water Lifting Pump | ⊙⊙⊘ | 00.0 | 00.0 | 00.0 |

FIG.2

SWP Complete Report

Monitoring SWP with 28 trains for a total of 56 equipment bodies.

Complete: <u>Train</u>, <u>Body</u>, <u>Tag</u>  Exception: <u>Train</u>, <u>Body</u>, <u>Tag</u>

| Train (300) | Service | Level 1 RunStatus (302) | 1 day %Util (308) | 30 days %Util | 90 days %Util | Body | Equipment Type (306) | Conf Lvl | RunStatus (307) |
|---|---|---|---|---|---|---|---|---|---|
| A-231A | A-231A Air Compression | ⊘⊙⊙ | 00.0 | 00.0 | 00.0 | A-231A | Centrifugul Compressor | 100 | ⊘⊙⊙ |
|  |  |  |  |  |  | DA-231A | Motor |  |  |
| A-231B | A-231B Air Compression | ⊙⊙⊘ (303) | 00.0 | 00.0 | 00.0 | A-231B | Centrifugul Compressor | 0 | ⊙⊙⊙ |
|  |  |  |  |  |  | DA-231B | Motor |  |  |
| A-231C | A-231C Air Compression | ⊘⊙⊙ (304) | 00.0 | 00.0 | 00.0 | A-231C | Centrifugul Compressor | 100 | ⊘⊙⊙ |
|  |  |  |  |  |  | DA-231C | Motor |  |  |
| G-171A | G-171A Main Power Generation | ⊘⊙⊙ (305) | 00.0 | 00.0 | 00.0 | DG-171A | Gas Turbine | 90 | ⊙⊙⊙ |
|  |  |  |  |  |  | G-171A | Generator | 195 | ⊘⊙⊙ |
| G-171B | G-171B Main Power Generation | ⊙⊙⊘ | 00.0 | 00.0 | 00.0 | DG-171B | Gas Turbine | 0 | ⊙⊙⊘ |
|  |  |  |  |  |  | G-171B | Generator | 0 | ⊙⊙⊘ |
| G-171C | G-171C Main Power Generation | ⊘⊙⊙ | 00.0 | 00.0 | 00.0 | DG-171C | Gas Turbine | 45 | ⊙⊙⊘ |
|  |  |  |  |  |  | G-171C | Generator | 195 | ⊘⊙⊙ |
| K-122A | K-122A Flash Gas Compression | ⊘⊙⊙ | 00.0 | 00.0 | 00.0 | DK-122A | Motor |  |  |
|  |  |  |  |  |  | K-122A | Reciprocating Compressor | 250 | ⊘⊙⊙ |
| K-122B | K-122B Flash Gas Compression | ⊘⊙⊙ | 00.0 | 00.0 | 00.0 | DK-122B | Motor |  |  |
|  |  |  |  |  |  | K-122B | Reciprocating Compressor | 250 | ⊘⊙⊙ |
| K-127A | K-127A Flash Gas Compression | ⊘⊙⊙ | 00.0 | 00.0 | 00.0 | DK-127A | Motor |  |  |
|  |  |  |  |  |  | K-127A | Reciprocating Compressor | 250 | ⊘⊙⊙ |
| K-127B | K-127B Flash Gas Compression | ⊘⊙⊙ | 00.0 | 00.0 | 00.0 | DK-127B | Motor |  |  |
|  |  |  |  |  |  | K-127B | Reciprocating Compressor | 250 | ⊘⊙⊙ |
| K-153A | K-153A Export Gas Compression | ⊘⊙⊙ | 00.0 | 00.0 | 00.0 | DK-153A | Gas Turbine |  |  |
|  |  |  |  |  |  | K-153A | Centrifugul Compressor | 300 | ⊘⊙⊙ |
| K-153B | K-153B Export Gas Compression | ⊙⊙⊘ | 00.0 | 00.0 | 00.0 | DK-153B | Gas Turbine |  |  |
|  |  |  |  |  |  | K-153B | Centrifugul Compressor | 0 | ⊙⊙⊘ |
| P-222A | P-222A Heating Medium Circulation Pumping | ⊘⊙⊙ | 00.0 | 00.0 | 00.0 | DP-222A | Motor |  |  |

FIG.3

REMOTE MONITORING SYSTEMS AND METHODS

CROSS-REFERENCE TO RELATED APPLICATIONS

This application claims priority, pursuant to 35 U.S.C. §119(e), of U.S. Provisional Application Ser. No. 60/944,286, entitled "REMOTE MONITORING SYSTEMS AND METHODS," filed on Jun. 15, 2007 in the name of James Kong, and is hereby incorporated by reference.

BACKGROUND

U.S. Patent Application Publication 2008/0129507 discloses a method for employing radio frequency (RF) identifier (ID) transponder tags (RFID tags) to create a unique identifier, termed an RFID signature, for use within a data processing system with respect to a person or an object. An interrogation signal is transmitted toward a person or an object with which a set of one or more RFID tags are physically associated. A first set of RFID tag identifiers are obtained from an interrogation response signal or signals returned from the set of one or more RFID tags. A mathematical operation is performed on the first set of RFID tag identifiers to generate an RFID signature value, which is employed as an identifier for the person or the object within the data processing system with respect to a transaction that is performed by the data processing system on behalf of the person or the object. U.S. Patent Application Publication 2008/0129507 is herein incorporated by reference in its entirety.

U.S. Patent Application Publication 2008/0016353 discloses a method and system for verifying the authenticity and integrity of files transmitted through a computer network. Authentication information is encoded in the filename of the file. Authentication information may be provided by computing a hash value of the file, computing a digital signature of the hash value using a private key, and encoding the digital signature in the filename of the file at a predetermined position or using delimiters, to create a signed filename. Upon reception of a file, the encoded digital signature is extracted from the signed filename. Then, the encoded hash value of the file is recovered using a public key and extracted digital signature, and compared with the hash value computed on the file. If the decoded and computed hash values are identical, the received file is processed as authentic. U.S. Patent Application Publication 2008/0016353 is herein incorporated by reference in its entirety.

SUMMARY OF THE DISCLOSURE

In one embodiment, the invention provides a method comprising selecting a piece of equipment to be monitored; selecting a plurality of operating parameters to monitor; calculating a deviation for each of the operating parameters; and calculating a composite index for the piece of equipment based on the deviations.

In another embodiment, the invention provides a method comprising (a) selecting a piece of equipment to be monitored; (b) selecting a plurality of operating parameters to monitor; (c) calculating a deviation for each of the operating parameters; (d) calculating a composite index for the piece of equipment based on the deviations; (e) repeating steps (c) and (d) a plurality of times; and (f) calculating a change in time composite index.

Other aspects of the invention will be apparent from the following description and the appended claims.

BRIEF DESCRIPTION OF DRAWINGS

FIG. 1 is a composite index generator according to embodiments of the present disclosure.

FIGS. 2 and 3 are user interfaces of composite index generator products according to embodiments of the present disclosure.

DETAILED DESCRIPTION

Figure 4:
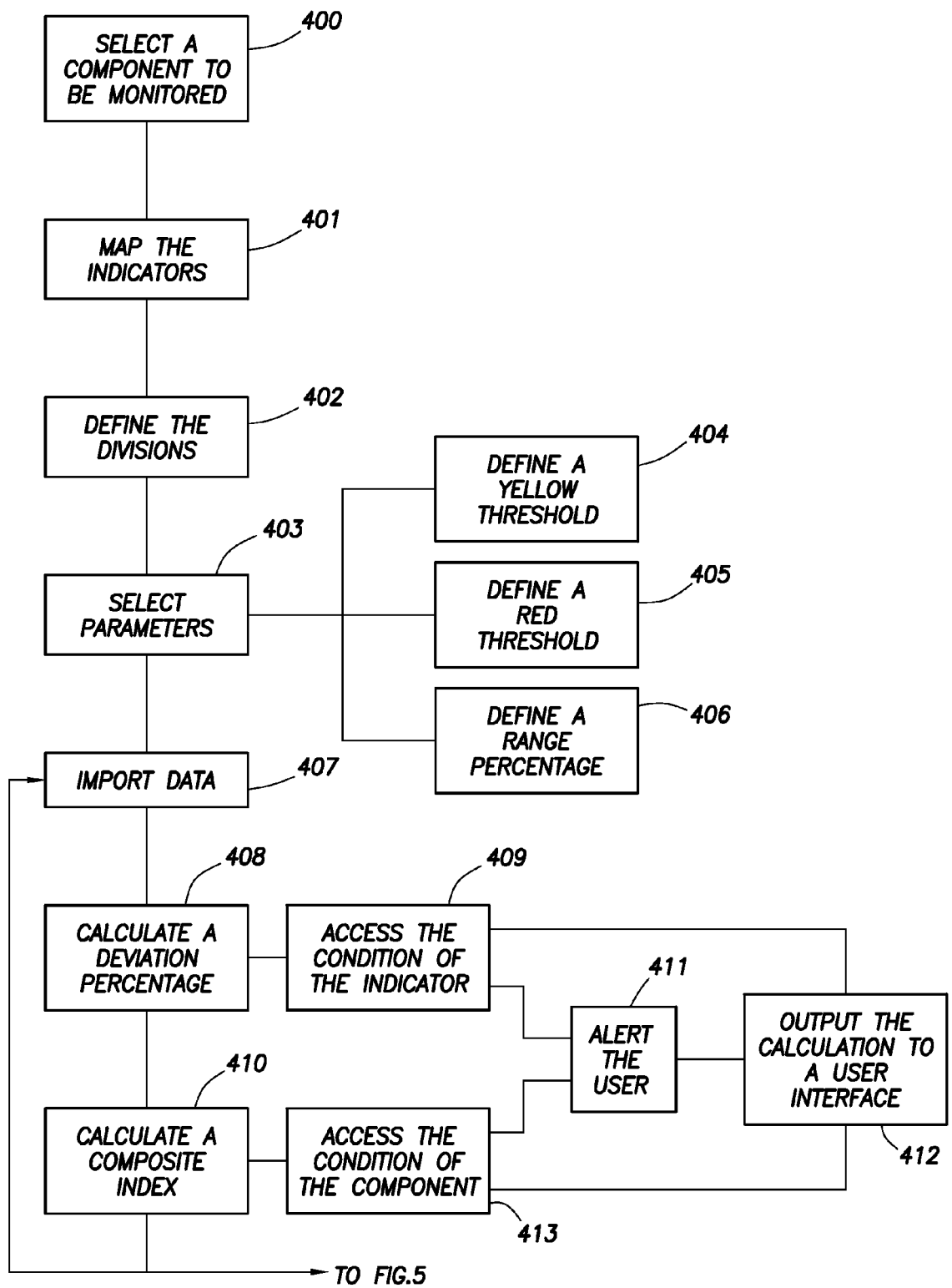
FIGS. 4 and 5 are flowchart diagrams of setting up and operating a composite index generator according to embodiments of the present disclosure.

Specific embodiments of the disclosure will now be described in detail with reference to the accompanying figures. Like elements in the various figures are denoted by like reference numerals for consistency.

In one aspect, embodiments disclosed herein relate to systems and methods for monitoring the performance and health of industrial process equipment. More specifically, embodiments disclosed herein relate to systems and methods for monitoring and tracking the performance and health of industrial process equipment using key performance indicators for the specific equipment. More specifically still, embodiments disclosed herein relate to systems and methods for creating composite indexes for monitoring and tracking the health and performance of industrial process equipment.

Generally, equipment refers to individual components of an industrial process, such as, for example, centrifugal compressors, centrifugal pumps, reciprocating compressors, gas turbines, steam turbines, gas engines, heaters, exchanges, and other components found in industrial processing. The specific embodiments discussed below are specific to the processing of gas during refining, however, those of ordinary skill in the art will appreciate that the systems and methods disclosed herein may be used with other processes, such as other oil and gas processes, manufacturing, transportation, etc. Thus, the examples discussed below are illustrative in nature, and should not be considered exhaustive as to the applicability of the herein disclosed systems and methods.

The performance of industrial process equipment may include the performance of the specific components themselves, or trains, which include a series of equipment bodies operatively connected together to produce a specific product. Thus, performance, as used herein, may refer to the performance of the individual components, trains, or the performance of a site, which typically includes multiple trains for the production of one or more products.

The health of the industrial process refers to the condition of the equipment, including the condition of individual components, trains, or the overall condition of the site. The health of industrial process equipment may thus refer to the overall operability of the equipment, and may take into consideration aspects of the equipments, such as, for example, efficiency, operability, life span, maintenance requirements, etc.

The monitoring and tracking of performance and health of sites, trains, and components provides for the assessment of two primary indicators, reliability and availability. Reliability refers to how reliable the equipment is in operation, and takes into account likelihood of downtime, past problems with the equipment, maintenance requirements, etc. Availability refers to whether the equipment is in condition to be used in a specific industrial process.

The embodiments for monitoring and tracking industrial process performance and health may be used in larger systems that involve the optimization of the individual components discussed herein. Thus, the present disclosure may be used as a monitoring component of a larger system, such as the remote monitoring services discussed in U.S. Patent Application Ser. No. 60/944,286, previously incorporated by reference.

The systems and methods for monitoring and tracking industrial process performance and health disclosed herein include the generation of a composite index derived from tracking key performance indicators (KPI), which are determined by monitoring industrial process components, trains, and site equipment. In this embodiment, the index represents the health and/or performance of the component, train, or site by converting the KPIs into a real number ranging between 0.0% and 100.0%. Accordingly, 0.0% indicates a best possible condition, while 100% represents the worst indexed condition. In certain embodiments, the composite index may actually result in a real number over 100%, however, such results are factored out, and are represented as a failure condition resulting in an index value of 100%.

A composite index value may thus range between 0.0% and 100%, as discussed above. Additionally, the composite index may be interpreted by a user as having an acceptable range, defined as the range where the component, train, or site optimally operates, a warning range, defined as a range that indicates that certain aspects of the component, train, or site are operating out of specification, but the component, train, or site as a whole is still within specification, and a failure mode, defined by a threshold level whereby any greater value indicates that the component, train, or site is no longer operating acceptably. Examples of ranges may include an acceptable range of 0.0% to 74.9% and a warning range of 75.0% to 99.9%, while 100% may define a failure mode. Thus, as long as the component, train, or site operates with a composite index value of between 0.0% and 74.9%, the system is operating acceptably, while after 75.0%, the composite index value indicates that a problem with a component, train, or site may be occurring. Those of ordinary skill in the art will appreciate that different ranges may define acceptable ranges, warning ranges, and threshold failure mode indicators, and as such, the ranges defined above are exemplary.

The composite index may be used in a number of different ways to evaluate performance and health of an industrial process. In one embodiment, the composite index may be used to evaluate the health and equipment currently (i.e., in real or near real-time), while in other embodiments, the composite index may be used to evaluate a rate of change or change in health and/or performance over a selected time interval. While the general process for generating the index is the same for either a current or change of time calculation, both methods are discussed in detail below.

Equations for Current Time Indexes

Current time composite indexes allow a user to know the state of equipment for a selected time, which in certain embodiments may be as the process is occurring, such that adjustments to equipment may occur in real-time. In such embodiments, the index may be populated with updated data on a regular basis, such as every minute, five minutes, ten minutes, or other select time intervals as required or desired by the system or user. The data input into the index generator may thus require data from other aspects of a monitoring system, such as outputs from sensors on equipment and/or deviation outputs from first principle engineering models.

One equation for formulating a current time composite index in accordance with embodiments disclosed herein includes:

$$Y_k = \sqrt{\frac{\sum_{i=1}^{n}\left(\frac{X_k i - C_i}{C_i}\right)^2}{n}} \qquad \text{Equation (1)}$$

where $Y_k$ is the current time index, n is the number of outputs used in the model for the specific piece of equipment, and $X_k$ is the deviation output from a first principle model. Current time index ($Y_k$) is then defined in terms of a number between 0.0 and 100%, such that any $Y_k$ greater than 100.0% is treated as 100%.

The current time composite index may then be used in a real-time system to provide up-to-date performance and health information in terms of an index, where index values between 0.0% and 100% indicate the relative health of a component (i.e., piece of equipment) in the system. As discussed above, a user may define additional ranges within the index to indicate various warning levels, thereby allowing the composite index value to be used to interpret performance and/or health of a component of the system.

Equations for Rate of Change

In other embodiments, a rate of change composite index may be calculated based on changes in the performance and/or health of a component over time. In certain embodiments, the rate of change composite index may indicate the rate of change on a week-to-week, month-to-month, quarter-to-quarter, or year-to-year basis. Those of ordinary skill in the art will appreciate that the time period over which the change is measured will vary based on the type of component being monitored, as well as specific requirements of the industrial process.

As discussed above, a rate of change composite index may require input from sensor data and/or data from first principle models. Additionally, the current time composite index calculated above may be used to determine the change over time of the composite index. One equation for formulating a rate of change composite index according to embodiments disclosed herein includes:

$$Y_{\Delta k} = \sqrt{\frac{\sum_{i=1}^{n}\left(\frac{X_{\Delta k i} - C_i}{C_i}\right)^2}{n}} \qquad \text{Equation (2)}$$

where $Y_{\Delta k}$ is the current time index, n is the number of outputs used in the model for the specific piece of equipment, and $X_{\Delta k}$ is the deviation output from a first principle model. The calculated rate of change index may then be defined as a percentage between 0.0% and 100.0%, allowing a user to determining a health or performance change of a component of an industrial process over a specific period.

To further explain the generation of composite indexes, examples will be discussed below for specific types of equipment that may be monitored. Those of ordinary skill in the art will appreciate that the composite indexes below are illustrative, and in other embodiments, other types of equipment used in industrial processes may also be monitored and composite indexes generated therefrom.

EXAMPLES

FIG. 1:

Referring to FIG. 1, an index generator according to one embodiment of the present disclosure is shown. In this embodiment, the equipment being monitored is a centrifugal compressor. Initially, a division 100, or data range, is defined for the generator, thereby providing the possible range of the index. Additionally, a user defines a yellow threshold percent 101, which may be used as a warning level to notify a user that a problem with the equipment may be occurring, and a red threshold percent 102, which defines the failure point for the equipment.

The next step is determining the number of indicators 103 that the generator will use for the specific equipment. The indicators may include changes in sensor data over time, or may include data provided by first principle models, as described above. In the present embodiment, the generator includes four indicators 103, including delta T, delta Eff., delta head, and delta power. Thus, the generator uses changes in temperature, efficiency, position, and power to monitor the performance and health of the equipment. Those of ordinary skill in the art will appreciate that the number of indicators 103 may vary depending on the type of equipment being monitored, and as such, in certain embodiments as few as one indicator 103 may be used, while in other embodiments five, ten, or more than ten indicators 103 may be used.

The generator also includes a range percent 104 for each indicator 103. The range percent 104 is the range within which an acceptable value for a specific indicator 103 may fall. For example, in an embodiment where an optimal temperature is 100° C., a range percent of 20.0 may allow the temperature to range between 80° C. and 120° C., and still be within an acceptable range. Thus, range percent 104 includes a range of plus or minus a certain percent above or below an acceptable parameter. Accordingly, when designing a generator, a user defines an acceptable value for a specific indicator 103, and then defines a range percent 104 to be used in evaluating the indicator 103.

Current 105 is the present value of the indicator 103. Thus, current 105 is a value supplied by either sensor data or first principle models, as described above. As illustrated, current 105 is displayed as a value within the range percent 104.

Deviation percent 106 is determined by multiplying current 105 by division value 100, and then dividing the product by the value of the range percent 104 for indicator 103. Thus, in the present embodiment, the deviation percent for delta T is current (i.e., 13.00) multiplied by division (i.e., 100.0), divided by range percent (i.e., 20.00), or 65.00. Deviation percent 106 thereby indicates the percent deviation the current 105 has from an acceptable value for the specific indicator 103. This calculation is then repeated for each indicator 103.

The deviation percent 106 is then squared (i.e., the deviation percent squared value 107), thereby resulting, in the present application, in a value of 4225.00 for indicator 103 delta T. This calculation is repeated for each indicator 103. For delta T, the deviation percent squared values 107 for each indicator 103 are then summed and divided by the square root of the number of indicators 103, the square of the quotient of which is taken. Thus, in the present embodiment, the deviation percent squared values 107 for each indicator 103 is 19125.00, which is divided by the square root of the number of indicators 103, which is 2, resulting in a quotient of 9562.50, of which the square is 97.79, which defines a raw index 112. Because the raw index 112 has a value of 97.79 which is less than 100.0, the raw index is the same as the composite index 108. Thus, in the present embodiment, the composite index 108 is 97.79. Because the yellow threshold 101 was previously defined as 75.0% and the red threshold 102 was defined as 100%, the composite index 108 provides a user information indicating that the equipment is operating in a warning mode, but has not entered a failure mode.

In addition to providing information about the performance and health of the equipment generally through composite index 108, the generator provides specific information about indicators 103. Because the deviation percent 106 is calculated for each indicator 103, a yellow 108 and/or red 109 condition for each indicator 103 may be determined. In this embodiment, indicator 103 delta Eff. has a deviation percent of 80.0%, which is above yellow threshold 101, but below red threshold 102. Thus, delta Eff. returns a yellow condition 108, thereby providing a user information that the efficiency of the equipment is operating below specification.

Similarly, a rate of change composite index 110 may be calculated for the present embodiment. In this embodiment, the same indicators 103 are used as in the above-described example. Furthermore, the same general calculation occurs, with the exception that instead of using a range percent, a percent different per month 111 is used. After determining that the raw index 112 is 105.48, the index must be adjusted to fall within the 0.0% to 100.0% range for the rate of change composite index 110. Because raw index 112 is greater than 100.0%, the composite index is displayed to the user as 100.0%, thereby indicating that the monthly rate of change is greater than desired.

Furthermore, the generator may provide a user with rate of change yellow 108 and red 109 conditions for each indicator 103. In this embodiment, the deviation percent 106 for delta Eff. was 75.0%, which met the yellow threshold 101, thereby triggering a yellow condition 108. Additionally, the deviation percent 106 for the delta head was 110.0%, which met the yellow threshold of 75.0% and the red threshold of 100.0%, thereby triggering both a yellow 108 and a red 109 condition. Thus, overall, the monthly rate of change resulted in two yellow conditions 108 and one red condition 109.

Those of ordinary skill in the art will appreciate that composite indexes 108 and 110 may be used to monitor the performance and health of equipment in real-time or for specified periods of time, such as daily, weekly, monthly, quarterly, or yearly. Thus, embodiments disclosed herein may provide both short-time and long time-analysis of components in terms of a composite index, which provides a user the ability to determine when performance and/or health of equipment is failing, before it actually fails, and thereby take remedial action to solve the problem. More specifically, long time-based analysis may be used to determine trend data, thereby allowing for performance and health of equipment to be monitored and operating condition changes adjusted.

Additionally, a composite index value 108 or change of time composite index value 110 greater than 100.0% may occur as a result of a failure mode condition (i.e., a red condition) 109 for one or more indicators 103, even if the composite index value 108 or 110 is still less than 100.0%. If one indicator 103 meets a failure mode condition, the component may not function within acceptable limits, and as such, the composite index will be adjusted to report to the user a value of 100.0%. Those of ordinary skill in the art will appreciate that by allowing for the composite index value to be adjusted if any indicator enters a failure mode, the performance and health of the component may more accurately reflex the action condition of the component.

The composite indexes generated herein may be used by a site, train, or component monitoring service to determine the status of individual equipment. Thus, the composite indexes may be displayed through a user interface, such as a monitor, or email. Generally, a user may access a user interface and select a particular site to be monitored. Because the site includes a number of trains, wherein each train includes a number of components, the user interface may enable for the user to view the performance and/or health of the site, trains, and/or components. Examples of the type of information that composite health indexes, as disclosed herein, may provide, include high level condition overviews of trains and equipment. Examples of such high-level overview will be discussed in detail below.

User Interface

FIG. 2:

Referring to FIG. 2, a user interface of a high level view of a train report, according to embodiments of the present disclosure is shown. In this embodiment, the user interface includes a listing of individual trains 200, wherein each train is assigned a particular class 201, such as, for example, air compression, main power generation, flash gas compression, etc. Each train is also monitored, so as to produce a run status 202, which is illustrated as a stoplight display including multiple colors lights to indicate whether equipment is in operation, and if so, in what condition the equipment is operating. In this embodiment, run status 202 is represented by a red light 203 if the train is not running or running in failure mode, a yellow light 204 if the train is operating in a warning mode, and a green light if the train is running within acceptable operating parameters. Thus, using such visual representations of the condition of the train, a user is provided an overview of the condition of trains at a particular site.

To determine the operating condition of the trains, the composite health indexes described above may be used to determine if a train is operating in an acceptable condition 205, a warning mode 204, or a failure mode 203. Such a determination may be made by using the yellow thresholds and red thresholds of the composite indexes, described above, as indicators corresponding to the warning mode 204 (yellow threshold) and failure mode 203 (red threshold). Furthermore, rate of change composite indicators may be used to determine train performance and/or health for long-term utilization indicators 206. Such indicators 206 may thus be used to provide a user with an overview of the performance and health of a train as it has changed over a selected time period.

FIG. 3:

In addition to using the composite indexes as indicator of train performance and health, additional user interface displays may be generated to display component (i.e., body) performance and health. Referring to FIG. 3, a user interface of a high level view of a body report, according to embodiments of the present disclosure is shown.

The body description report shows each train 300, including a run status 302, as well as each body 306 within the train including a body run status 307. The body report may then provide the user an overview of the function of individual components, such that the user may determine when component of the train is not functioning, as well as view a confidence level for each component, such that appropriate action may be taken if a component is causing a train to fail.

As the composite indexes were used to provide information to a user about train status (FIG. 2), composite indexes may be used to provide users information about specific bodies. Thus, to determine the operating condition of the bodies 306, the composite health indexes described above may be used to determine if a train is operating in an acceptable condition 305, a warning mode 304, or a failure mode 303. Such a determination may be made by using the yellow thresholds and red thresholds of the composite indexes, described above, as indicators corresponding to the warning mode 304 (yellow threshold) and failure mode 303 (red threshold). Furthermore, rate of change composite indicators may be used to determine train performance and/or health for long-term utilization indicators 308. Such indicators 308 may thus be used to provide a user with an overview of the performance and health of a train as it has changed over a selected time period. Those of ordinary skill in the art will appreciate that composite indexes may also be generated for a site, to determine the performance and health of a site at a selected time or to determine the performance and health of a site over a selected time period.

Composite Index Generator Set-up and Operation

Figure 5:
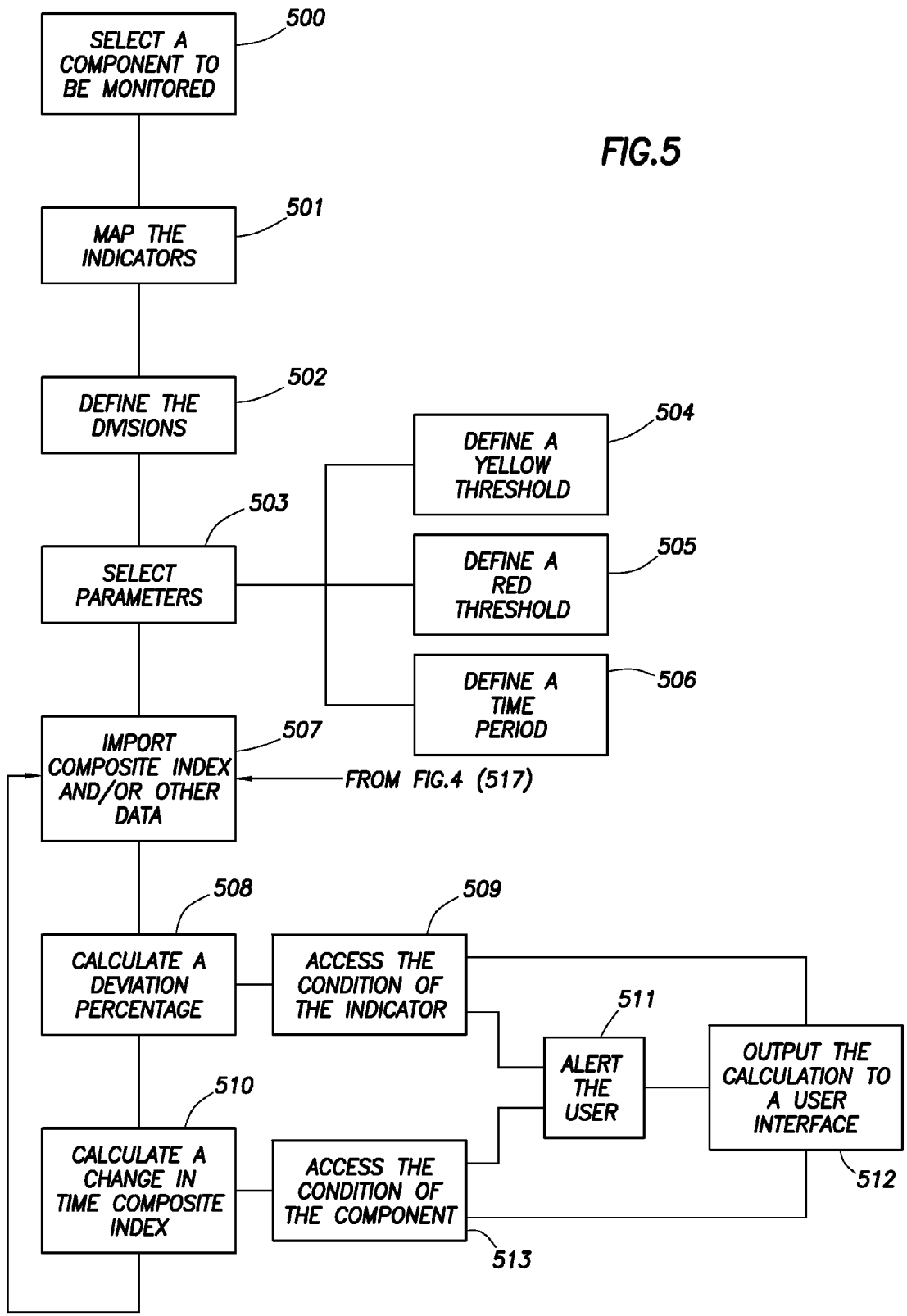

FIG. 4:

FIGS. 4 and 5 show flowcharts in accordance with one or more embodiments of the present disclosure. While the various steps in this flowchart are presented and described sequentially, one of ordinary skill will appreciate that some or all of the steps may be executed in different orders, may be combined or omitted, and some or all of the steps may be executed in parallel.

Referring to FIGS. 4 and 5, methods of setting up and operating composite index generators according to embodiments of the present disclosure are shown. Initially, a user, customer, or third-party selects 400 a component to be monitored. The component may include any of the above-mentioned components, and in certain embodiments, a train or site may alternatively be monitored. After component selection, the indicators on the components are mapped 401, thereby indicating the specific indicators that will be used in the composite index generation. Mapping 401 includes determining the type of data that is available, such as through sensor data and/or first principle models. In addition to mapping 401 the component, specific indicators may be selected and time periods for generator updates may be defined. Thus, in certain composite index generators, the indicators may be mapped and a time interval may be set, such that the generator receive real-time or near real-time data updates. Alternatively, a time period may be set that allows the generator to be updated at less frequent time periods, such as, for example, every few minutes or several times an hour.

After the indicators are mapped 401, divisions are defined 402. Divisions are defined 402 to provide the generator with a data range for calculating deviation percentages. Next, parameters values for the generator are selected 403. Example selections 403 include yellow threshold selection 404, red threshold selection 405 and range percentage selection 406. After defining 402 the divisions and making all requisite selections 403-406, the generator is prepared to be populated with data from sensors and/or models.

When the generator is prepared, data is imported 407 from the sensors and/or models at the defined time increments, for example, in minute increments. The generator then calculates 408 a deviation percentage. The deviation percentage may then be used to access 409 the condition of the component, or otherwise used to calculate 410 a composite index value.

Assessing 409 the condition of the component based on the deviation percentage includes comparing the deviation percentage to the defined yellow and red threshold levels. If the deviation percent is equal to or above the yellow or red threshold levels, a user may be alerted 411. The alert 411 may include both visual and/or aural alerts, however, in certain embodiments, the alert may include outputting 412 the calculated condition to a user interface, as described above with reference to FIG. 1, 2 or 3.

After the composite index is calculated 410, the index may be accessed 413 to determine whether the composite index value falls within an acceptable range, or otherwise results is in excess of a yellow threshold and/or red threshold. If the value of the composite index is greater than the yellow and/or red threshold, the user may be alerted 411, or the value may be output 413 to a user interface, as described.

After composite index value calculation 410, the generator may enter a repeat loop 416, wherein the generator pauses calculations 410 until a next sequence of sensor or model data is imported 407, at which time the generator may repeat steps 408-413. In addition to accessing 413 the composite index value, the generator may output 412 the composite output value to a second index generator, such as a rate of change composite index generator, as will be described in detail with respect to FIG. 5.

FIG. 5:

Referring specifically to FIG. 5, the process for setting up a rate of change composite index generator is similar to setting up the composite index generator described in FIG. 4. Specifically, a component is selected 500 for monitoring, and indicators of the component are mapped 501. Divisions for the component are then defined 502, and parameter values for the generator are selected 503. Selection of parameter values may include selection of yellow and red thresholds 504 and 505, as well as selection of a time period value, such that a percent change per period may be calculated. The time period value may include, for example, selection of a daily percent change, monthly percent change, quarterly percent change, and/or a yearly percent change. Those of ordinary skill in the art will appreciate that other time periods may be selected as desired by a user or required for a given component.

After the parameter values for the generator are selected 503, the generator is prepared to be populated with data. In this embodiment, composite index data may be imported 507 from the composite index generator described in FIG. 4 (indicated by character reference 517). The generator then calculates 508 a deviation percentage. The deviation percentage may then be used to access 509 the condition of the component over time, or otherwise used to calculate 510 a rate of change composite index value.

Assessing 509 the condition of the component based on the deviation percentage includes comparing the deviation percentage to the defined yellow and red threshold levels. If the deviation percent is equal to or above the yellow or red threshold levels, a user may be alerted 511. The alert 511 may include both visual and/or aural alerts, e-mail alerts, and auto-shutdown procedures; however, in certain embodiments, the alert may include outputting 512 the calculated condition to a user interface, as described above with reference to FIG. 1, 2 or 3.

After the rate of change composite index is calculated 510, the index may be accessed 513 to determine whether the rate of change composite index value falls within an acceptable range, or otherwise results in a value in excess of a yellow threshold and/or red threshold. If the value of the composite index is greater than the yellow and/or red threshold, the user may be alerted 511, or the value may be output 512 to a user interface, as described above.

After the rate of change composite index value calculation 510, the generator may enter a repeat loop, wherein the generator pauses calculations 510 until a next sequence of composite index data is imported 507, at which time the generator may repeat steps 508-513. In addition to accessing 513 the rate of change composite index value, the generator may output the rate of change composite output value to another index generator, such as a train and/or site composite index generator or rate of change composite index generator.

Those of ordinary skill in the art will appreciate that the embodiments discussed above are illustrative in nature, and as such, the specific order of setting up and operating the generators may vary. Accordingly, alternate embodiments including additional parameter selection, as well as selecting, defining, calculating, accessing, outputting, and altering in a different order is also within the scope of the present disclosure.

Generally, embodiments of the present disclosure allow for an industrial process to be accessed by a remote monitoring service, such that the remote monitoring service may receive information about specific components at the process location. For example, in certain embodiments, a remote monitoring service may monitor components of an industrial process by receiving sensor data from components of the process. After receiving the sensor data, the remote monitoring service may proceed to analyze the data and determine whether the process is operating within acceptable conditions. If the process is not operating at a desired or required level of efficiency, the remote monitoring service may alert a process operator that a portion of the system is failing. For example, the remote monitoring service may alert an operator that a component of the system is not operating at a required level of functionality. The operator may then take corrective action, or in certain embodiments, may request additional information from the remote monitoring service, such as a suggested corrective action.

In addition to analyzing information from an industrial process, embodiments of the present disclosure may allow operators to receive real-time updates as to the status of the process. For example, in certain embodiments, the remote monitoring service may analyze information from an industrial process and send time interval based updates to the operator indicating the overall health of the process, or the health of individual components of the process. If the health of the process, or a component of the process falls out of an acceptable range, the remote monitoring service may inform the operator of the condition, and either suggest corrective action, or otherwise contact engineering experts such that the condition may be resolved.

Additionally, because the monitoring services may be remotely location, the industrial process and the remote monitoring services do not need to be located with geographical proximity. Thus, in certain embodiments, the remote monitoring station may be located thousands of miles from the industrial process. Because the remote monitoring services does not need to be in close proximity to the industrial process, multiple processes may be monitored by a centralized remote monitoring service.

According to embodiments of the present disclosure, customers may interact with remote monitoring services though a number of different connections, thereby allow for real-time communication, monitoring, and analysis of customer processes by the remote monitoring service. Additionally, in certain aspects, vendors may interact with the remote monitoring service, so as to provide additional information to the remote monitoring service as industrial processes are monitored.

As used herein, customers refer to any individuals or entities that use the remote monitoring service to monitor, analyze, and provide solutions for industrial processes. Remote monitoring services interface with customers though varied connection such as, for example, both wired and wireless connections. In certain embodiments, remote monitoring services may interface with customers and/or vendors through satellite uplinks, thereby allowing the real-time transmission of data therebtween.

In certain embodiments, remote monitoring services provide technological solutions that allow industrial processes to be monitored, the results of the monitoring analyzed, and the results of the analysis sent to customers. The results of the analysis may include optimized process parameters, such that the operation of the industrial process meets required and/or desired level of efficiency. Furthermore, the results of the analysis may be used to generate predictive models, such that the remote monitoring service may provide information to a customer regarding, for example, routine maintenance, problems as they occur, and general process inefficiency. The generated models may also be stored in centralized databases such that multiple remote monitoring services may interface, sharing the aggregate knowledge, thereby further increasing accuracy of the models and solutions.

Because remote monitoring services may be centralized and do not need to be located proximate to specific industrial processes, remote monitoring services may provide third party function to multiple industrial processes. However, in certain embodiments, the remote monitoring service may also provide in-house analysis of industrial process, and as such, the systems and methods disclosed herein may be used in both in-house applications and third party application on a contractual basis.

Those of ordinary skill in the art will appreciate that while the below described processes are specific to petroleum exploration and production, downstream refining, and gas and power production, embodiments disclosed herein may be applied to other processes, such as manufacturing, transportation, and/or testing facilities. Thus, the embodiments discussed below are illustrative to systems and methods of the remote monitoring of processes.

Figure 6:
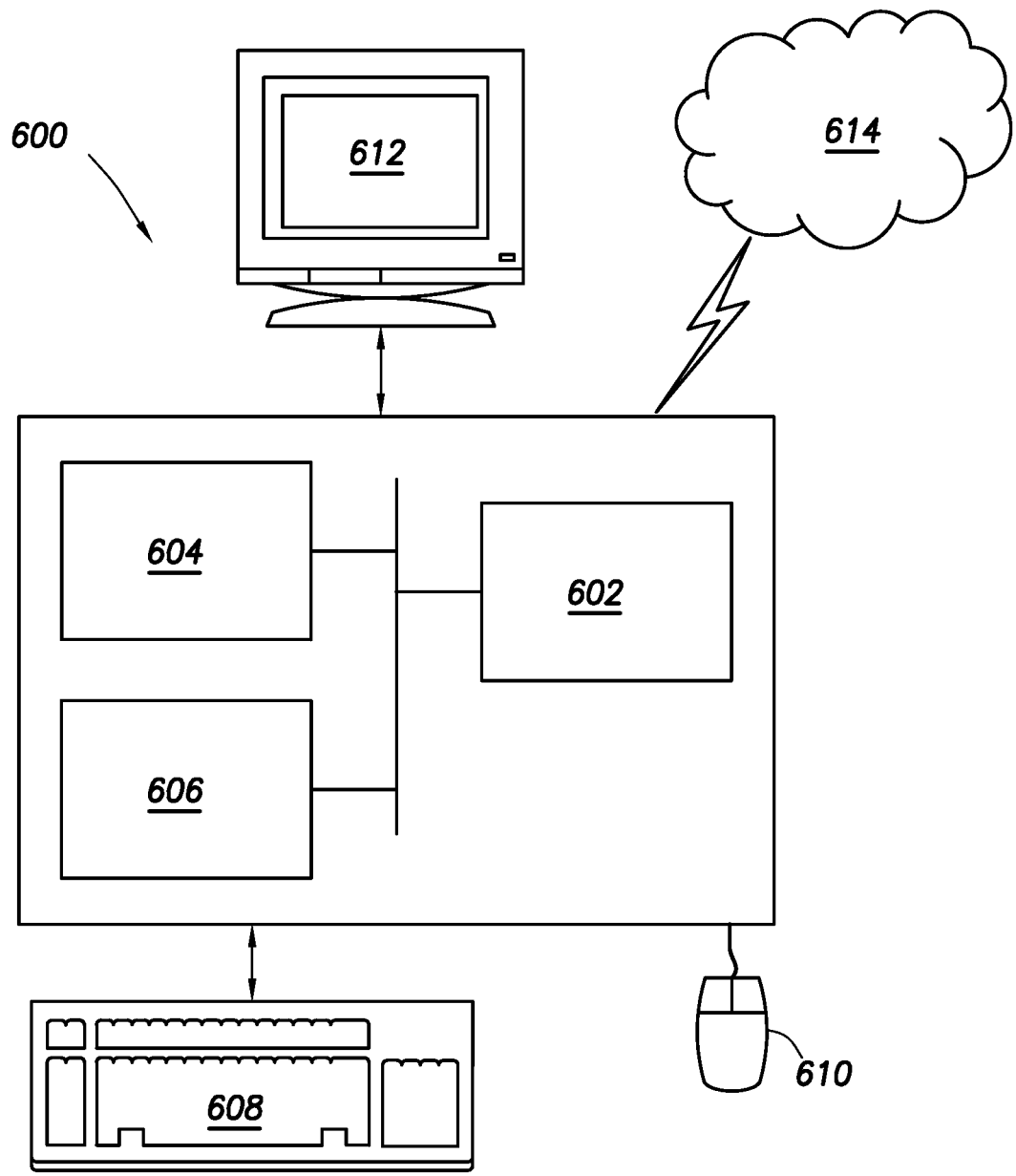
FIG. 6 shows a computer system in accordance with one or more embodiments of the present disclosure.

FIG. 6:

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., data repository, signature generator, signature analyzer, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Advantageously, embodiments of the present disclosure may allow for composite indexes to be generated thereby allowing for the health and performance of components, trains, and industrial process sites to be monitored and tracked. The composite indexes may also provide a user up-to-date information regarding the condition of equipment, thereby allow the user to take remedial, as well as proactive steps to fix a problem with the equipment before the problem results in downtime to the industrial process. Also, advantageously, embodiments disclosed herein may allow for equipment trends to be monitored and tracked, such that a change to the condition of equipment over longer periods of time may be monitored. Thus, embodiments disclosed herein may provide users both short-term and long-term diagnostic tools for monitoring and tracking equipment performance and health.

Illustrative Embodiments

In one embodiment, there is disclosed a method comprising selecting a piece of equipment to be monitored; selecting a plurality of operating parameters to monitor; calculating a deviation for each of the operating parameters; and calculating a composite index for the piece of equipment based on the deviations. In some embodiments, the method also includes defining ranges for each of the operating parameters. In some embodiments, the method also includes defining an acceptable, warning, and failure range for each of the operating parameters. In some embodiments, the method also includes defining an acceptable, warning, and failure range for the composite index. In some embodiments, the method also includes alerting a user when the composite index is outside of an acceptable range. In some embodiments, the method also includes outputting the composite index to a user interface.

In one embodiment, there is disclosed a method comprising (a) selecting a piece of equipment to be monitored; (b) selecting a plurality of operating parameters to monitor; (c) calculating a deviation for each of the operating parameters; (d) calculating a composite index for the piece of equipment based on the deviations; (e) repeating steps (c) and (d) a plurality of times; and (f) calculating a change in time composite index. In some embodiments, the method also includes defining ranges for each of the operating parameters. In some embodiments, the method also includes defining an acceptable, warning, and failure range for each of the operating parameters. In some embodiments, the method also includes defining an acceptable, warning, and failure range for the change in time composite index. In some embodiments, the method also includes alerting a user when the change in time composite index is outside of an acceptable range. In some embodiments, the method also includes outputting the change in time composite index to a user interface. In some embodiments, the change in time composite index is calculated on a daily, weekly, monthly, quarterly, or yearly time basis.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

The invention claimed is:

1. A method of monitoring operating equipment comprising:
selecting a piece of equipment to be monitored;
selecting a plurality of operating parameters of the piece of equipment to monitor;
obtaining a present value for each of the plurality of operating parameters;
defining an acceptable range for each of the plurality of operating parameters;
calculating a deviation percentage for each of the plurality of operating parameters based on the present value and the acceptable range for each of the plurality of operating parameters;
calculating a composite index for the piece of equipment using a summation of squares of each deviation percentage, wherein the summation is divided by a square root of a cardinality of the plurality of operating parameters to obtain the composite index;
and
presenting the composite index.

2. The method of claim 1, further comprising defining a warning range and a failure range for each of the operating parameters.

3. The method of claim 1, further comprising defining an acceptable range, a warning range, and a failure range for the composite index.

4. The method of claim 3, further comprising alerting a user when the composite index is outside of the acceptable range for the composite index.

5. The method of claim 1, wherein presenting the composite index comprises displaying the composite index on a user interface.

6. A method of monitoring operating equipment comprising:
(a) selecting a piece of equipment to be monitored;
(b) selecting a plurality of operating parameters of the piece of equipment to monitor;
(c) obtaining a present value for each of the plurality of operating parameters;
(d) defining an acceptable range for each of the plurality of operating parameters;
(e) calculating a deviation percentage for each of the plurality of operating parameters based on the present value and the acceptable range for each of the plurality of operating parameters;
(f) calculating a composite index for the piece of equipment using a summation of squares of each deviation percentage, wherein the summation is divided by a square root of a cardinality of operating parameters to obtain the composite index;
(g) repeating steps (c), (d), (e), and (f) a plurality of times to obtain a set of composite indices;
(h) calculating a rate of change of the composite index using the set of composite indices; and
(i) presenting the rate of change of the composite index.

7. The method of claim 6, further comprising defining a warning range and a failure range for each of the operating parameters.

8. The method of claim 6, further comprising defining an acceptable range, a warning range, and a failure range for the composite index.

9. The method of claim 8, further comprising alerting a user when the composite index is outside of the acceptable range for the composite index.

10. The method of claim 6, wherein presenting the rate of change of the composite index comprises displaying the rate of change of the composite index on a user interface.

11. A non-transitory computer readable medium storing instructions for monitoring operating equipment, the instructions causing a processor to:
select a piece of equipment to be monitored; select a plurality of operating parameters of the piece of equipment to monitor; obtain a present value for each of the plurality of operating parameters; define an acceptable range for each of the plurality of operating parameters;
calculate a deviation percentage for each of the plurality of operating parameters based on the present value and the acceptable range for each of the plurality of operating parameters;
calculate a composite index for the piece of equipment using a summation of squares of each deviation percentage, wherein the summation is divided by a square root of a cardinality of the plurality of operating parameters to obtain the composite index; and
present the composite index.

12. The computer readable medium of claim 11, wherein the instructions further comprise functionality to define a warning range and a failure range for each of the operating parameters.

13. The computer readable medium of claim 11, wherein the instructions further comprising functionality to define an acceptable range, a warning range, and a failure range for the composite index.

14. The computer readable medium of claim 13, wherein the instructions further comprise functionality to alert a user when the composite index is outside of the acceptable range for the composite index.

15. The computer readable medium of claim 11, wherein functionality to present the composite index comprises functionality to display the composite index on a user interface.

* * * * *